(12) United States Patent
Beers et al.

(10) Patent No.: US 7,558,823 B2
(45) Date of Patent: Jul. 7, 2009

(54) SYSTEM AND METHOD FOR MANAGING VIRTUAL COLLABORATION SYSTEMS

(75) Inventors: Ted Beers, Corvallis, OR (US); Mark E. Gorzynski, Corvallis, OR (US); Richard N. Mckay, Corvallis, OR (US); James A. Borg, Corvallis, OR (US); April Slayden Mitchell, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 11/497,886

(22) Filed: Aug. 2, 2006

(65) Prior Publication Data
US 2007/0282994 A1 Dec. 6, 2007

Related U.S. Application Data

(60) Provisional application No. 60/803,588, filed on May 31, 2006, provisional application No. 60/803,584, filed on May 31, 2006.

(51) Int. Cl.
*G06F 15/16* (2006.01)

(52) U.S. Cl. .................................... 709/205; 348/14.08

(58) Field of Classification Search ................. 709/223, 709/244, 205
See application file for complete search history.

(56) References Cited

U.S. PATENT DOCUMENTS

| | | | |
|---|---|---|---|
| 5,007,046 A | 4/1991 | Erving et al. | |
| 5,058,153 A | 10/1991 | Carew et al. | |
| 5,526,037 A * | 6/1996 | Cortjens et al. | 348/14.1 |
| 5,844,600 A | 12/1998 | Kerr | |
| 5,848,098 A | 12/1998 | Cheng et al. | |
| 5,898,668 A * | 4/1999 | Shaffer | 370/230 |
| 6,078,809 A | 6/2000 | Proctor | |
| 6,128,649 A | 10/2000 | Smith et al. | |
| 6,148,068 A | 11/2000 | Lowery et al. | |
| 6,300,973 B1 | 10/2001 | Feder et al. | |
| 6,327,276 B1 | 12/2001 | Robert et al. | |
| 6,535,604 B1 | 3/2003 | Provencal et al. | |
| 6,590,604 B1 | 7/2003 | Tucker et al. | |
| 6,989,856 B2 | 1/2006 | Firestone et al. | |
| 7,012,891 B1 | 3/2006 | Chandran et al. | |
| 7,043,528 B2 | 5/2006 | Schmitt et al. | |
| 7,047,279 B1 | 5/2006 | Beams et al. | |

(Continued)

FOREIGN PATENT DOCUMENTS

EP 1 613 046 A 1/2006

OTHER PUBLICATIONS

Kolbehdari et al. "Session Initiation Protocol (SIP) Evolution in Converged Communications." Intel Technology Journal, vol. 10, Issue 01, Feb. 15, 2006. pp. 11-18.*

(Continued)

*Primary Examiner*—Andrew Caldwell
*Assistant Examiner*—Christopher Biagini

(57) ABSTRACT

A system includes a communication network, a plurality of nodes communicatively coupled to the communication network, a gateway subsystem communicatively coupled to the communication network, and a management subsystem communicatively coupled to the gateway subsystem. The gateway subsystem is configured to receive and translate signals from the plurality of nodes for use by the management subsystem. Further, the management subsystem is configured to dynamically manage the topology of a virtual collaborative event based on the node signals.

21 Claims, 11 Drawing Sheets

U.S. PATENT DOCUMENTS

| | | | |
|---|---|---|---|
| 7,069,234 B1 | 6/2006 | Cornelius et al. | |
| 7,075,919 B1 | 7/2006 | Wendt et al. | |
| 2002/0156874 A1* | 10/2002 | Suorsa et al. | 709/220 |
| 2002/0161862 A1* | 10/2002 | Horvitz | 709/220 |
| 2003/0088876 A1* | 5/2003 | Mao et al. | 725/91 |
| 2003/0103075 A1* | 6/2003 | Rosselot | 345/717 |
| 2003/0217132 A1* | 11/2003 | Batten et al. | 709/223 |
| 2004/0239754 A1* | 12/2004 | Shachar et al. | 348/14.08 |
| 2005/0078170 A1 | 4/2005 | Firestone et al. | |
| 2005/0080894 A1* | 4/2005 | Apostolopoulos et al. | 709/224 |
| 2006/0098086 A1* | 5/2006 | Chandra et al. | 348/14.07 |

OTHER PUBLICATIONS

Kolbehdari, "Session Initiation Protocal (SIP) Evolution . . . ", Feb. 15, 2006.

Chia-Wen et al, "Implementation of a Realtime Object-Based Virtual Meeting System", Aug. 25, 2001, pp. 565-568.

Ho, J-M et al, "A conference gateway supporting interoperability between SIP and H.323", Proc. of the 9th ACM Int'l Conf on Multimedia, Ottawa, Canada, Sep. 30-Oct. 5, 2001.

* cited by examiner

Orientations of Streams Transmitted

Orientations of Streams Received

SYSTEM AND METHOD FOR MANAGING VIRTUAL COLLABORATION SYSTEMS

RELATED APPLICATIONS

This application claims the benefit under 35 U.S.C. § 119 (e) of U.S. Provisional Patent Application No. 60/803,584 filed May 31, 2006, titled "Blended Space For Aligning Video Streams," and U.S. Provisional Patent Application No. 60/803,588 filed May 31, 2006, titled "System and Method for Managing Virtual Collaboration Systems," which applications are incorporated herein by reference in their entireties.

BACKGROUND

Videoconferencing and other forms of virtual collaboration allow the real-time exchange of video, audio, and other data among systems in remote locations. This real-time exchange of data often occurs over a computer network in the form of streaming video and audio data. Many systems can establish media streams at the beginning of an event, but cannot transition smoothly to new configurations as various systems enter or leave an event.

Additionally, numerous methods have been devised to connect systems with identical or substantially compatible capabilities. However, managing events involving systems with differing capabilities is substantially more difficult. For example, few existing methods for event configuration adequately negotiate media connections among heterogeneous systems. Those systems that require user input to establish connections detract from the collaborative experience. Other systems can establish connections automatically, but base media support on sometimes erroneous assumptions of the capabilities of participating systems.

One established protocol, Session Initiation Protocol (SIP), allows systems to negotiate media connections among multiple devices. However, SIP does not consider the relationships among media streams in order to maintain virtual relationships among participants. Moreover, SIP does not communicate the availability of advanced capabilities which would support optimal media connections.

Current virtual collaboration systems do not adequately support systems with varying levels of functionality or allow dynamic reconfiguration of participating systems without interruption of an event in progress. They also lack support for the establishment of consistent virtual relationships among participating systems.

SUMMARY

In one of many possible embodiments, the present exemplary includes a communication network, a plurality of nodes communicatively coupled to the communication network, a gateway subsystem communicatively coupled to the communication network, and a management subsystem communicatively coupled to the gateway subsystem. The gateway subsystem is configured to receive and translate signals from the plurality of nodes for use by the management subsystem. Further, the management subsystem is configured to dynamically manage the topology of a virtual collaborative event based on the node signals

BRIEF DESCRIPTION OF THE DRAWINGS

The accompanying drawings illustrate various embodiments of the present system and method and are a part of the specification. The illustrated embodiments are merely examples of the present system and method and do not limit the scope of the disclosure.

Throughout the drawings, identical reference numbers designate similar, but not necessarily identical, elements.

DETAILED DESCRIPTION

Figure 1:
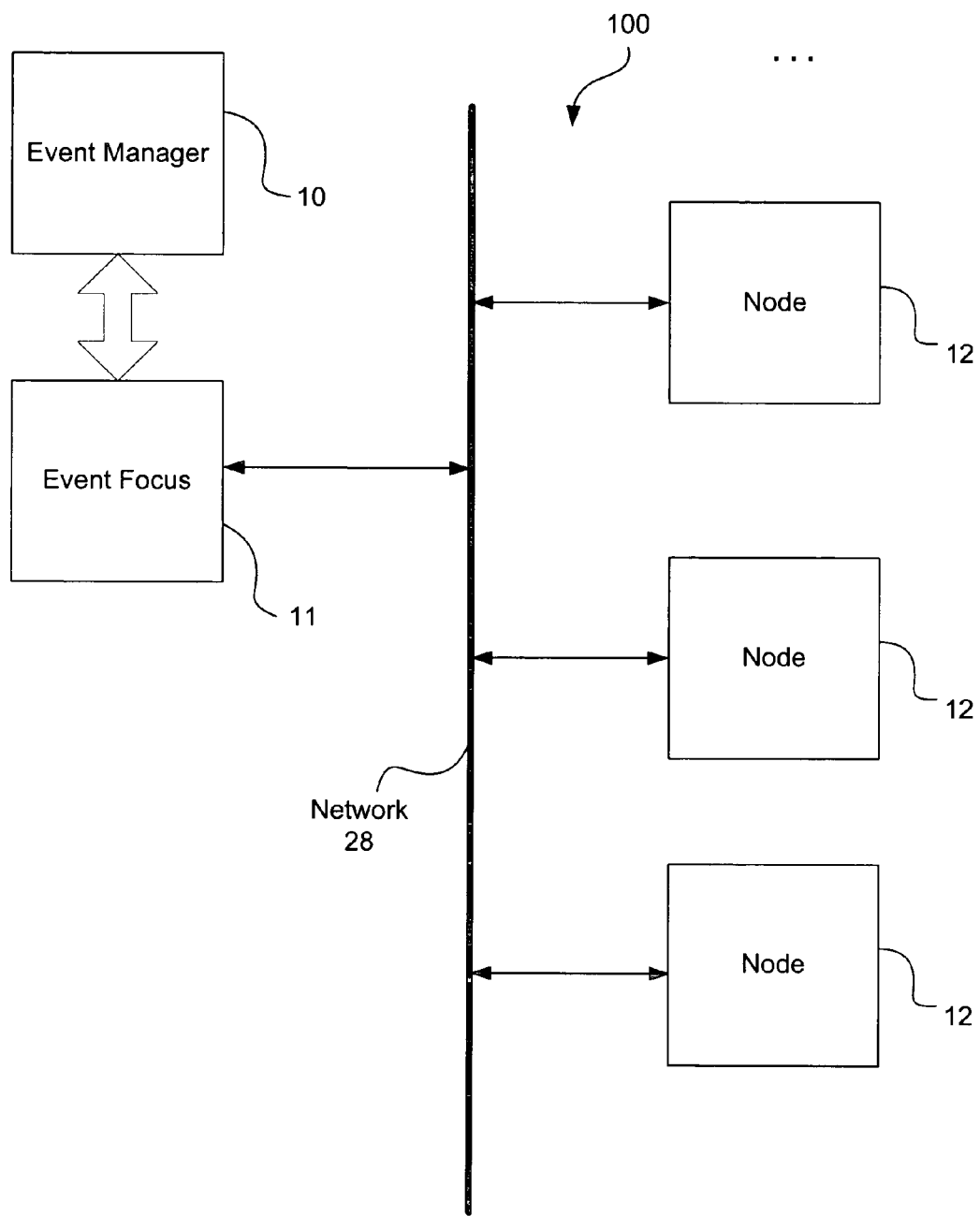
FIG. 1 is a block schematic illustrating members of an event manager system connected through a computer network, according to one exemplary embodiment.

The present exemplary method and system are adapted to manage the configuration of virtual collaboration systems during event adjustment. Specifically, the present exemplary method can, among other things, intrinsically consider the relationships among related media streams, manage the virtual relationships among nodes to optimize the directives to the nodes to support a new topology, and support a variety of proprietary and industry-standard communications mechanisms while managing each node equivalently in the event itself. Further details of the present exemplary virtual collaboration systems and methods will be provided below.

As used in the present specification and in the appended claims, the term "media" is defined to include text, video, sound, images, data, or any other information that may be transmitted over a computer network.

Additionally, as used in the present specification and in the appended claims, the term "node" is defined to include any system with means for displaying and/or transmitting media that is capable of communicating with a remote system directly or through a network. Suitable node systems include, but are not limited to, a videoconferencing studio, a computer system, a notebook computer, a telephone, a personal digital assistant (PDA), or any combination of the previously mentioned or similar devices.

Similarly, as used in the present specification and in the appended claims, the term "event" is meant to be understood broadly as including any designated time and virtual meeting place providing systems a framework to exchange information. An event allows at least one node to transmit and receive media information. According to one exemplary embodiment, the event exists separate and distinct from all nodes participating in collaboration. Further, an event may exist while nodes are exchanging information and may also exist while no nodes are participating, such as before any nodes have joined an event.

Further, as used in the present specification and in the appended claims, the term "topology" is meant to be understood as including each system associated with an event and its respective configuration, state, and relationship to other systems associated with the event. A topology includes, but is in no way limited to, nodes, event focus software, event manager software, virtual relationships among nodes, mode of participation of each node, and media streams associated with the event.

Moreover, as used in the present exemplary specification, the terms "subsystem" and "module" shall be used interchangeably to include any number of hardware, software, firmware components, or any combination thereof. As used in the present specification, the subsystems and modules may be a part of or hosted by one or more computing devices including, but in no way limited to, servers, personal computers, personal digital assistants, or any other processor containing apparatus. Various subsystems and modules may perform differing functions or roles and together remain a single unit, program, device, or system.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

FIG. 1 illustrates a management subsystem or an event manager system (100), according to one exemplary embodiment. As used herein, and in the appended claims the terms "management subsystem" and "event manager system" shall be used interchangeably. The illustrated event manager system (100) may be used to provide a number of collaborative events, as will be detailed below. Specifically, as illustrated in FIG. 1, the exemplary event manager system (100) couples various components through at least one communication network (28), according to one exemplary embodiment. As illustrated in FIG. 1, a plurality of nodes (12) or collaborative event participating subsystems can be communicatively coupled to the collaborative event manager system (100) by the communication network (28). Additionally, a collaboration event manager subsystem (10), hereinafter referred to as an event manager, can also be coupled, via an event focus subsystem (11) or other gateway subsystem, to the collaborative event manager system (100) through the network (28). Details of the communicatively coupling network, (28), followed by details of the various components of the event manager system (100) will be provided below with reference to FIGS. 1 through 4.

The communicatively coupling network (28) used to link the exemplary event manager system (100) illustrated in FIG. 1 may be a single data network or may include any number of communicatively coupled networks. Particularly, according to one exemplary embodiment, network(s) (28) utilized by the present exemplary event manager system (100) may include, but are in no way limited to, local area networks (LAN), wide area networks (WAN), metropolitan area networks, wireless networks, virtual private networks (VPN), Ethernet networks, token ring networks, public switched telephone networks (PSTN), general switched telephone networks (GSTN), switched circuit networks (SCN), integrated services digital networks (ISDN), and proprietary networks.

Additionally, according to one exemplary embodiment, the network(s) (28) may also employ any known networking protocol including, but in no way limited to, transmission control protocol/internet protocol (TCP/IP), hypertext transfer protocol (HTTP), file transfer protocol (FTP), H.323, T.120, Q.931, stream control transmission protocol (SCTP), session initialization protocol (SIP), multi-protocol label switching (MPLS), point-to-point protocol (PPP), real-time protocol (RTP), real-time control protocol (RTCP), real-time streaming protocol (RTSP), user datagram protocol (UDP). When multiple networks (28) are connected to the event manager system (100), any combination of network types and network protocols may be used. Use of the various network protocols may be harmonized by the event focus (11) translating data to and from a protocol preferred by the event manager (10), as detailed below.

Figure 2:
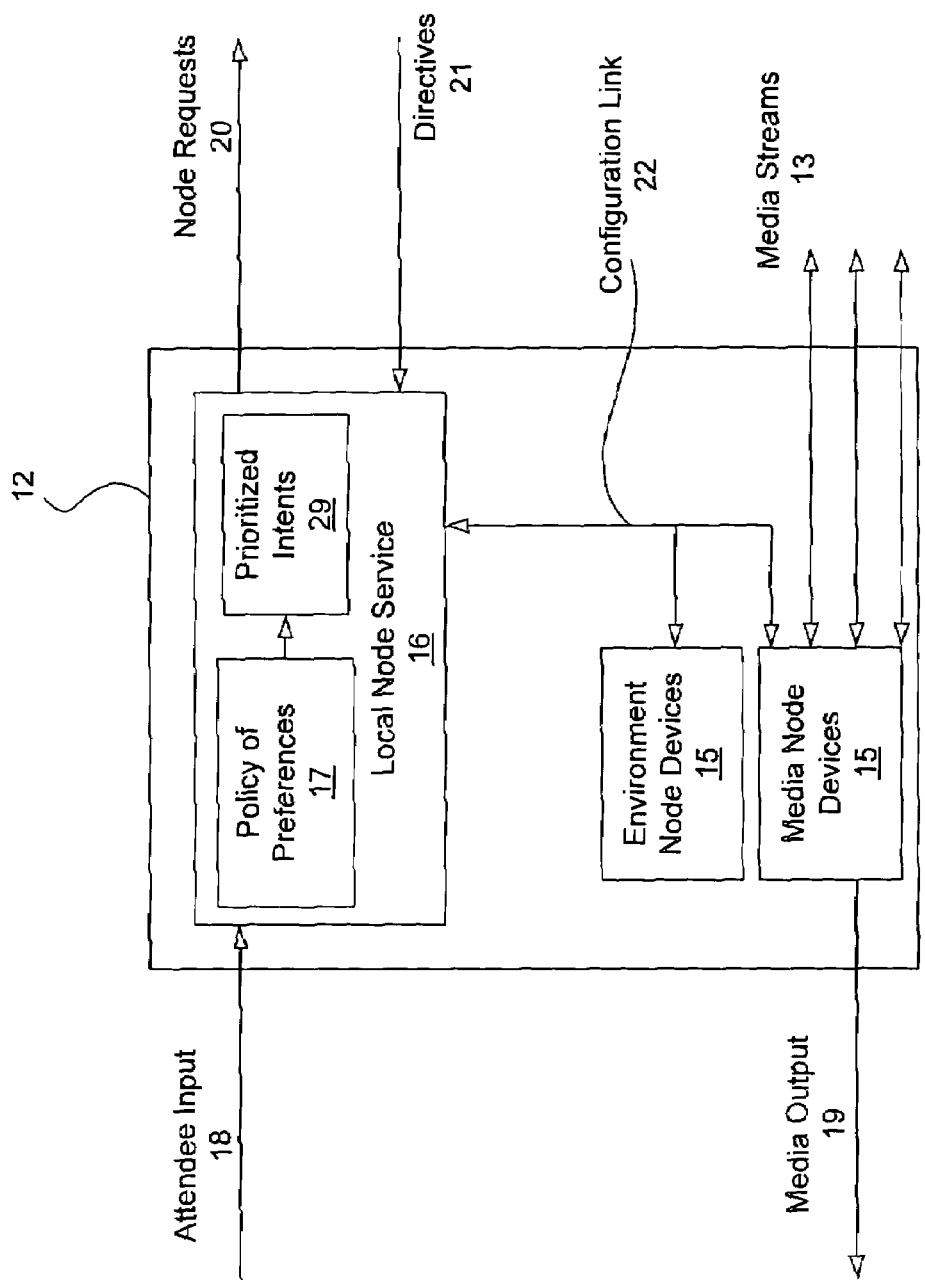
FIG. 2 is a block diagram illustrating node components in schematic form, according to one exemplary embodiment.

As detailed in FIG. 1, a plurality of nodes (12) may be coupled to an event manager (10) and an event focus (11) via the network(s) (28). FIG. 2 illustrates components of an exemplary node (12), as well as connections of the node to an event management system (100; FIG. 1), according to one exemplary embodiment. As mentioned previously and generally illustrated in FIG. 2, the exemplary node (12) is a system that can participate in a collaborative event by transmitting and/or receiving media data. Accordingly, the exemplary node (12) shown in FIG. 2 is illustrated as receiving and transmitting media streams (13), generating local media outputs (19), receiving attendee inputs (18) and system directives (21), as well as transmitting node requests (20). The physical form of the node (12) may vary greatly in capability, and may include telephones, personal digital assistants (PDA's), laptops, computer systems, video conferencing studios, and any other system capable of connecting to and transmitting data over a network. Each node (12) participating in an event is referenced during the event through a unique identifier that may be intrinsic to the system, connection dependent such as IP address or telephone number, assigned by the event manager based on event properties, or decided by another policy asserted by the system.

As shown, the exemplary node (12) can include any number of node devices (15) capable of displaying or representing media information received, transmitting media information generated, and/or adjusting the environment of the node (12). According to one exemplary embodiment, the node (12) in the form of a telephone can include a speaker and microphone as node devices (15). According to various other exemplary embodiments, the node devices (15) may include, but are in no way limited to, microphones, cameras, video screens, keyboards, scanners, and other input and output devices. A node device (15) may comprise any hardware or software element capable of interfacing with a node (12) or network. Some node devices (15) are capable of reproducing or representing received media in a manner discernable to an attendee. Other node devices (15) may adjust the environment of a node or support one or more additional node (12) functions. In the exemplary embodiment of FIG. 2, the exemplary node device (15) is shown as outputting to an attendee a representation of the received media from various media streams (13) as a local media output (19).

According to one exemplary embodiment, node devices (15) are communicatively coupled to the various possible media streams (13) negotiated by the system. Any number of media streams (13) may be connected to the node devices (15), according to the event topology and node capabilities.

The coupled media streams (13) may be heterogeneous and include media of different types. According to one exemplary embodiment, a node (12) could simultaneously transmit and receive media streams (13) comprising audio data only, video and audio, video and audio from a specified camera position, and/or collaboration data from a computer display to different nodes participating in an event.

Media streams (13) connected across at least one network (28; FIG. 1) may exchange data in a variety of formats. Media information transmitted and received may conform to coding and decoding standards including, but not limited to, G.711, H.261, H.263, H.264, G.723, common intermediate format (CIF), and proprietary standards. Additionally, any computer-readable file format may be transmitted to facilitate the exchange of text, sound, video, data, and other media types.

In addition to receiving various external inputs and media streams, the exemplary node (12) illustrated in FIG. 2 incorporates node manager (16) software. According to one exemplary embodiment, the node manager (16) software processes attendee input(s) (18) and other system directives (21) and configures the various node devices (15) according to received directives (21). Configuration of the node devices (15), as well as the level of participation for each node (12) may be varied by the capabilities of the node and variations in the desires of attendees, as provided by the attendee input (18). The various modes of participation are termed intents, and include, but are not limited to, n-way audio and video exchange, audio exchange only, audio and high resolution video, audio and low resolution video, dynamically selected video display, audio and graphic display of collaboration data, audio and video receipt without transmission, and any other combination of media input and output. The intent of a node is further defined to include actual or desirable relationships present among node devices (15), media streams (13), and other nodes (12), in addition to the specific combination of features and node devices (15) concurrently activated to receive and transmit media streams.

As shown in FIG. 2, the node manager (16) includes a pre-configured policy of preferences (17) within the node manager that creates a list of prioritized intents (29) from the possible modes of participation for the node (12) during a particular event. The prioritized intents (29) may change from event to event or during an event. For example, the prioritized intents (29) may change when a node attempts to join an event, leave an event, participate in a different manner, or when directed by the attendee.

As a node (12) modifies its prioritized intents (29), a node request (20) is sent to the system. In one embodiment, the node request (20) may comprise a simple act of connection such as dialing a telephone number. In another embodiment, the node request (20) includes the list of prioritized intents (29) and information about the capabilities of the node (12) transmitting the request. The node type, indicating unchanging capabilities of the node and relationships among the related node devices (15), may be summarized by a token such as "B2B6" which might imply "three displays, three cameras, three microphones, one speaker system." Additionally, the node type and associated token may indicate relationships between node devices (15), such as the positioning of three displays to the left, right, and center relative to an attendee. A node may not automatically send the same token or indication of node capabilities and relationships in every situation. Each node (12) may repeatedly selects and alter the description of capabilities and relationships to disclose. For example, if a node (12) includes three displays but the center display is broken or in use, the node (12) may transmit a token representing only two displays, one to the right and one to the left of an attendee. Thus, the only information about a node's capabilities and relationships that the event manager (10) receives is indicated through the node type and the node's prioritized intents (12). The node request (20) may further comprise a form of node identification.

Figure 3:
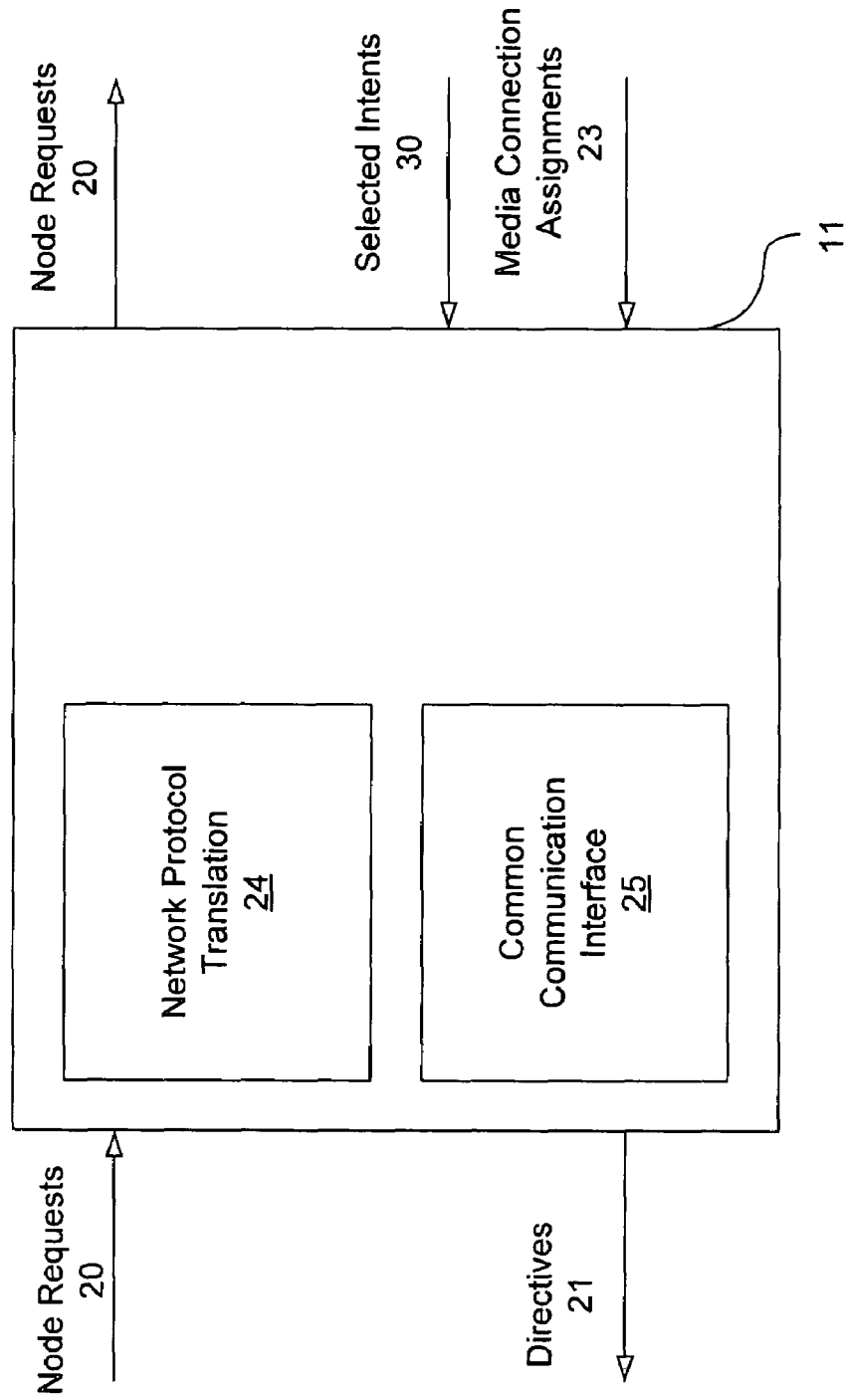
FIG. 3 is a block diagram illustrating components of the event focus in schematic form, according to one exemplary embodiment.

Returning again to FIG. 1, the various nodes (12) are coupled through a network (28) to an event manager (10), via an event focus (11). FIG. 3 illustrates the elements and functions of the event focus (11), according to one exemplary embodiment. As illustrated in FIG. 3, the event focus (11) is configured to perform intermediate processing before relaying node requests (20) to the event manager (10). Specifically, the event focus (11) may include a software module capable of remote communication with node service software at each node (12) participating in an event. The event focus (11) may include a common communication interface (25) and network protocol translation (24), according to one exemplary embodiment. The common communication interface (25) and the network protocol translation (24) allow the event focus to receive node requests (20) from nodes, forward the node requests to the event manager (10) and receive selected intents (30) and/or media connection assignments (23) from the event manager. The selected intents (30) and media connection assignments (23) can then be translated to directives (21) by the event focus (11) for transmission to selected nodes (12). The use of an event focus (11) to forward and process requests to the event manager (10) eliminates a need for individual nodes (12) to guarantee compatibility with potentially unforeseen network topologies and protocols.

According to the present exemplary system and method, the nodes (12) may participate in an event through various types of networks which may each have differing capabilities and protocols. The event focus (11) provides each node (12) with a common point of contact with the event. According to one exemplary embodiment, all node requests (20) transmitted to the event focus (11) are interpreted and converted to a format or protocol meaningful to the event manager (10).

After the event manager (10) determines the new event topology and media stream connections, the event manager transmits the data to the event focus (11) for distribution to the nodes (12). The event focus (11) then communicates individualized directives (21) to each affected node (12), indicating a change in the participation of the various nodes. According to one exemplary embodiment, a directive (21) can include the selected intent and new media connection assignments between the node (12) receiving the directive and any number of participating nodes. The event focus (11) is configured to communicate the various directives to nodes (12) through the preferred or actual network protocol for each node.

By way of explanation only, a node (12) including a telephone may submit a node request (20) to join an event in the form of dialing a number. This request implicitly indicates that the attendee's system supports the exchange of audio data and that the attendee desires to participate in the event in audio mode. Other requests may be more explicit. A node (12) may also send a direct request (20), which will be interpreted and translated to an appropriate form by an event focus (11) before the request is communicated to the event manager (10). When the event manager (10) generates media stream assignments, the event focus (11) will form directives (21) useful to each node (12), which, in the case of the telephone node, might comprise an established connection to a stream of composite audio data for the conference. The one or more event focus (10) subsystems do not determine which connections to assign but provide the event manager (10) one or more channels through which to communicate node configuration data, even if the data is destined for networks of differing protocols and capabilities. A single event focus (11) may communicate using multiple networks and/or protocols, and thus acts as a gateway between nodes (12) and an event manager (10). Also, multiple nodes (12) using the same protocol may communicate with an event manager (10) through a single event focus (11). The event focus also allows the event manager (10) to communicate with nodes (12) from many manufacturers which may connect through Session Initialization Protocol (SIP) or other standards. Communication between a node (12) and an event manager (10) is routed through at least one event focus (11) even if the node (12) and the event manager (10) use the same network and protocol.

According to another exemplary embodiment, one node (12) coupled to the exemplary system (100) might participate in an event through a local area network, another node may participate through the internet, and a third node may participate through an encrypted virtual private network (VPN). As each node (12) joined the event, left the event, or requested to change intent, the corresponding node request (20) would be translated by its associated event focus (11) into the form preferred by the event manager (10). The module for network protocol translation (24) may employ encryption, decryption, authentication, or other capabilities to facilitate communication between the nodes (12) and the event manager (10).

Figure 4:
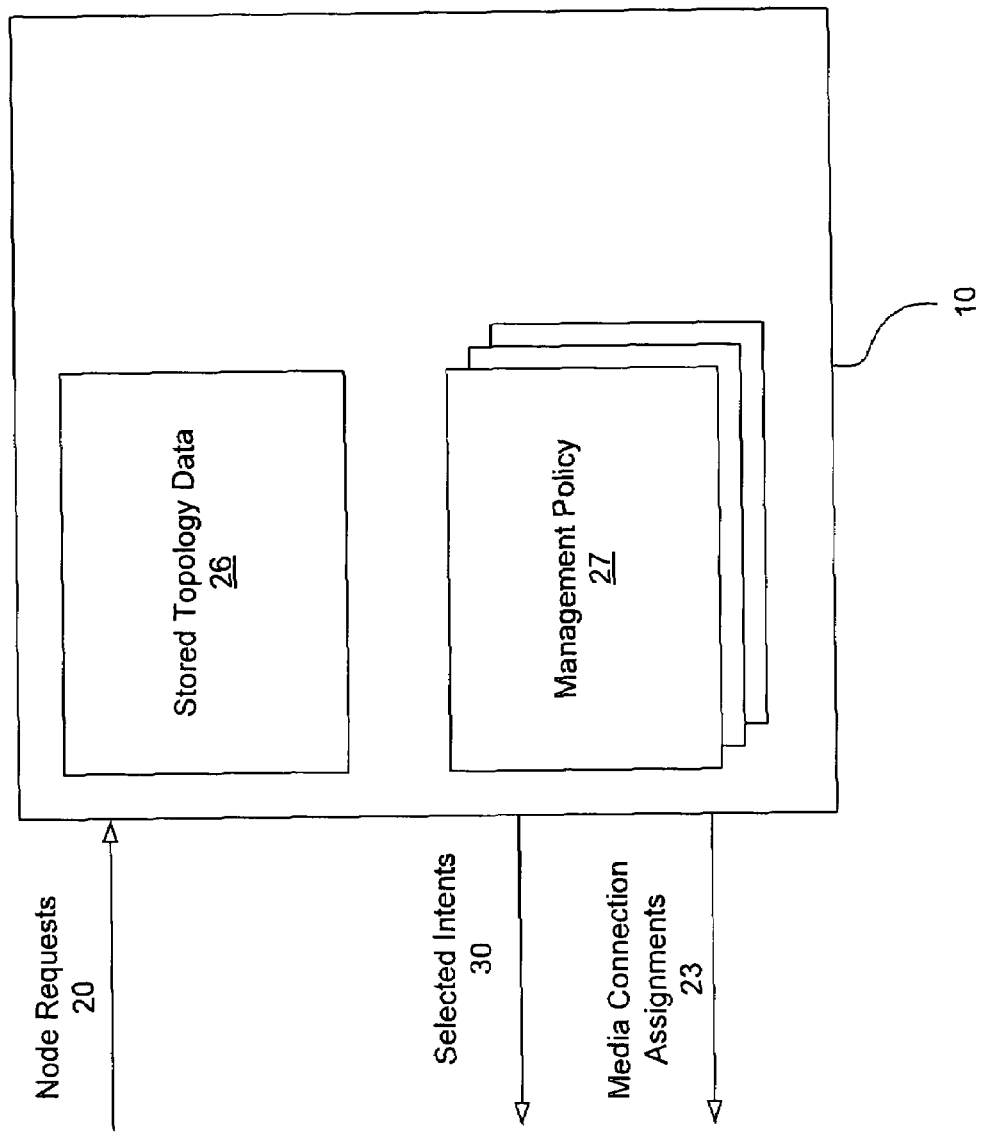
FIG. 4 is a block diagram showing components of the event manager in schematic form, according to one exemplary embodiment.

FIG. 4 illustrates the components, inputs, and outputs of the event manager (10), according to one exemplary embodiment. According to the exemplary embodiment illustrated in FIG. 4, the event manager (10) communicates with the event focus (11) directly. However, according to one alternative exemplary embodiment, the event manager (10) may be communicatively coupled to the event focus via a communication network (28).

Regardless of the communication means between the event focus (11) and the event manager (10), the exemplary event manager illustrated in FIG. 4 includes a stored topology data module (26) and a plurality of management policies (27). According to one exemplary embodiment, the stored topology data module (26) associated with the event manager (10) describes the state of an event as perceived by the event manager. This data may, according to one exemplary embodiment, include the identity of nodes (12) participating in an event, the virtual relationships among the nodes, the intent or manner in which each node is participating, and the capabilities of each node. The event manager (10) may also maintain a record of prioritized intents for each node (12). As mentioned previously, a node's intent includes information about relationships among multiple nodes (12) or node devices (15), whether present or desired, and specifies a narrow subset of a node's capabilities which are to be utilized during a given event in a certain manner. For example, a first node (12) may include three displays capable of displaying multiple resolutions. An intent for the first node (12) may include a specified resolution for media received from a certain second node (12), as well as the relationship that the media stream (13) from the second node (12) should be displayed on the leftmost display. Additionally, an event manager (10) may optimize an event topology based on the intents and/or combinations of intents received.

According to one exemplary embodiment, the event manager (10) is configured to receive node requests (20) from at least one event focus (11). The node requests (20) may be identical to the requests originally generated by the nodes (12) or may be modified by the event focus (11) to conform to a certain specification, interface, or protocol associated with the event manager (10).

According to one exemplary embodiment, the event manager (10) makes use of stored topology data (26) to create new media connection assignments (23) when a node (12) requests to join an event, leave an event, or change its intent. Prioritized intent information allows the event manager (10) to assign media streams (13) most closely matching each attendee's preferences. Additionally, virtual relationship data allows the event manager (10) to minimize disruption to the event as the topology changes, and node capability data prevents the event manager from assigning media streams (13) not supported by an identified node (12).

When a change in topology is requested or required, the event manager (10) selects the highest priority intent acceptable to the system for each node (12) from the prioritized intents (29). The selected intent (29) represents the mode of participation implemented for the node (12) at that time for the specified event. Changes in the event or in other systems participating in the event may cause the event manager (10) to select a different intent as conditions change. Selected intents may be conditioned on any number of factors including, but in no way limited to, network bandwidth or traffic, the number of other nodes participating in an event, the prioritized intents of other participating nodes or other nodes scheduled to participate, a policy defined for the current event, a pre-configured management policy (27), or other system parameters.

According to one exemplary embodiment, the management policy (27) associated with the event manager (10) is a pre-configured policy which, according to one embodiment, specifies which nodes (12) or attendees are permitted to join an event. The management policy (27) may also apply conditions or limitations for an event including, but in no way limited to, a maximum duration, a maximum number of connected nodes (12), a maximum available bandwidth, a minimum security authentication, or minimum encryption strength.

The event manager (10) is configured to transmit a description of the updated event topology to an associated event focus (11). This information includes the selected intents (30) for each node (12) as well as the updated media connection assignments (23) for each node. The formation of media connection assignments (23) by the event manager (10) provides for the optimal formation and maintenance of virtual relationships between the nodes (12). Topology and intent information may also be used to modify the environment of one or more nodes (12), including node devices (15) not directly related to the transmission, receipt, input, or output of media. Central management by the event manager (10) applies a consistent management policy (27) for all requests and topology changes in an event. Additionally, the event manager further eliminates potentially conflicting configurations of node devices (15) and media streams (13). Details of the exemplary operation of the event manager system (100) will be described below, with reference to FIGS. 5 through 10 below.

Exemplary Methods

Figure 5:
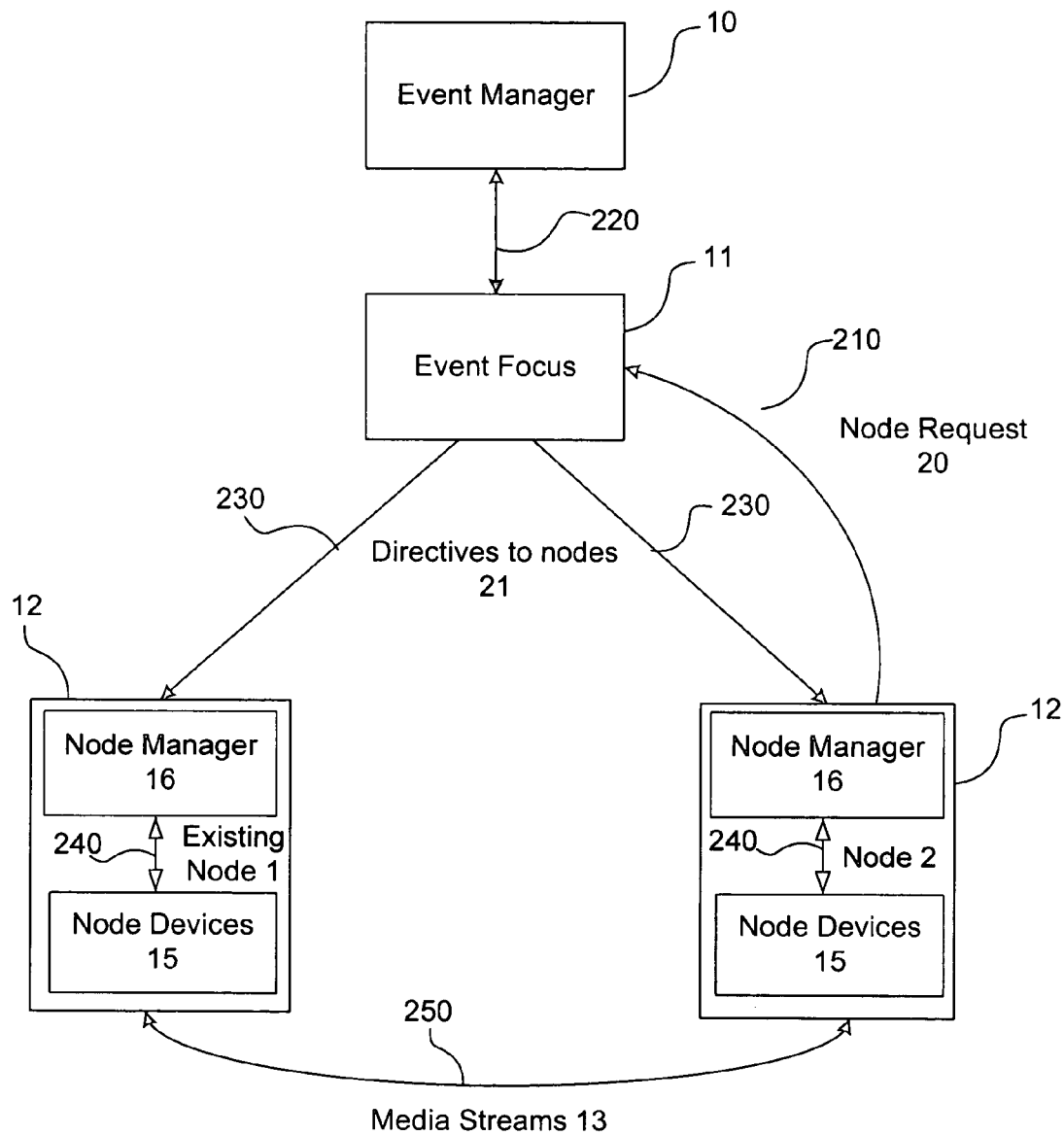
FIG. 5 is a block diagram illustrating the sequence of connections established as a node joins a collaborative event, according to one exemplary embodiment.

FIG. 5 illustrates a sequence of connections utilized as a node (12) joins an event in progress, according to one exemplary embodiment. According to the exemplary embodiment illustrated in FIG. 5, the node (12) sends an initial request to the event focus (11) requesting to join the event, illustrated by arrow 210. This request (20) contains information including the node type, or capabilities of the node (12), as well as prioritized intents or preferred modes of participation of the node.

When the initial request is received by the event focus (11), the event focus then forwards the request to the event manager

(10) and in turn receives those aspects of the updated event topology from the event manager which are necessary to be transmitted to the nodes (12) associated with the event focus (11), including new media connection assignments (23) and selected intents (30). This two-way communication between the event manager (10) and the event focus (11) is illustrated by the communication arrow 220.

After receiving the updated event topology from the event manager, including new media connection assignments (23) and selected intents (30), the event focus (11) translates the new media connection assignments and selected intents into directives (21). Once translated, the directives (21) are transmitted to each node (12) experiencing a change in configuration, as illustrated by transmission arrows 230.

As the identified nodes (12) receive the transmitted directives, node manager software (16) interprets and applies the directives (21) received and sends appropriate configuration data and commands over a communication link (22) to its node devices (15) to support the new topology. The mentioned communication between the node manager (16) and the node devices (15) is illustrated in FIG. 5 as communication arrow 240.

When appropriately configured to reflect the understood topology, media streams (13) are connected between the various nodes (12) as previously assigned by the event manager (10). The transmission of the various media streams is illustrated in FIG. 5 by communication arrow 250. The exemplary configuration illustrated in FIG. 5 provides for dynamic adjustments of system topology while managing node intents, capabilities, and configurations.

Figure 6A:
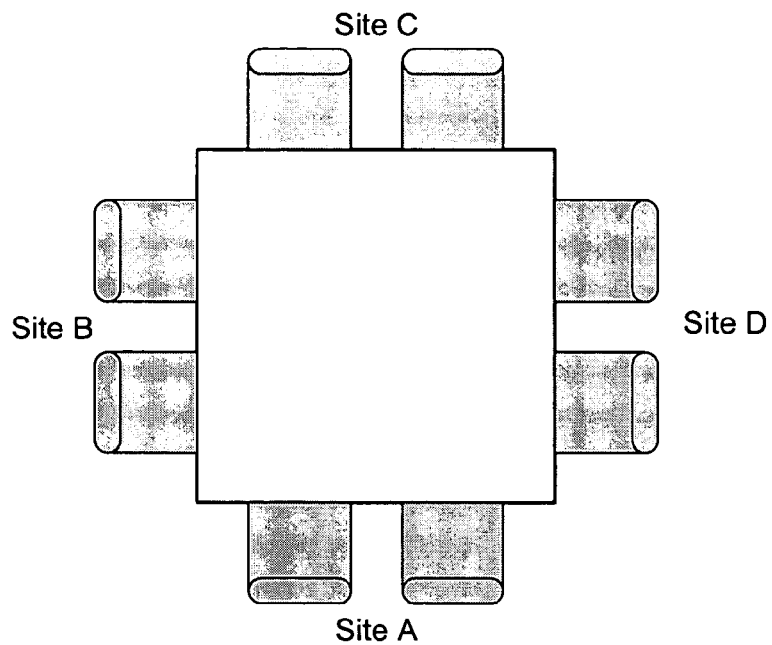
FIGS. 6A through 6D are schematics illustrating virtual relationships for collaborative events involving 3 or 4 nodes, according to various exemplary embodiments.
Figure 6B:
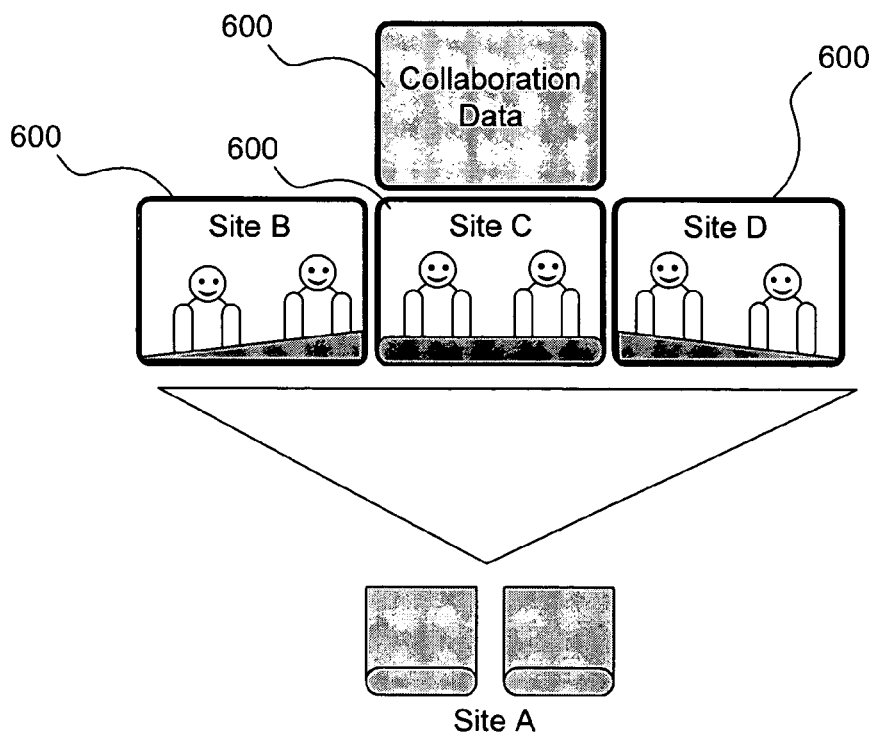
Figure 6C:
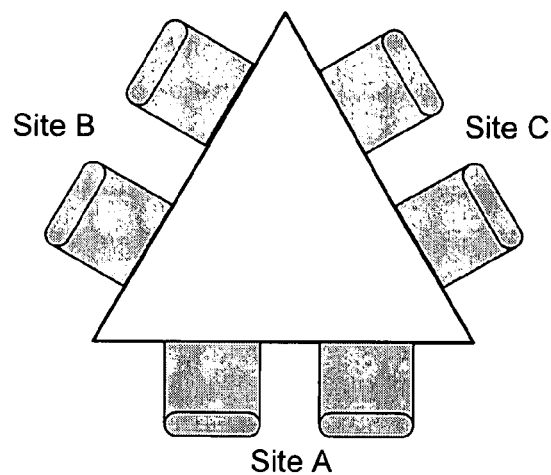
Figure 6D:
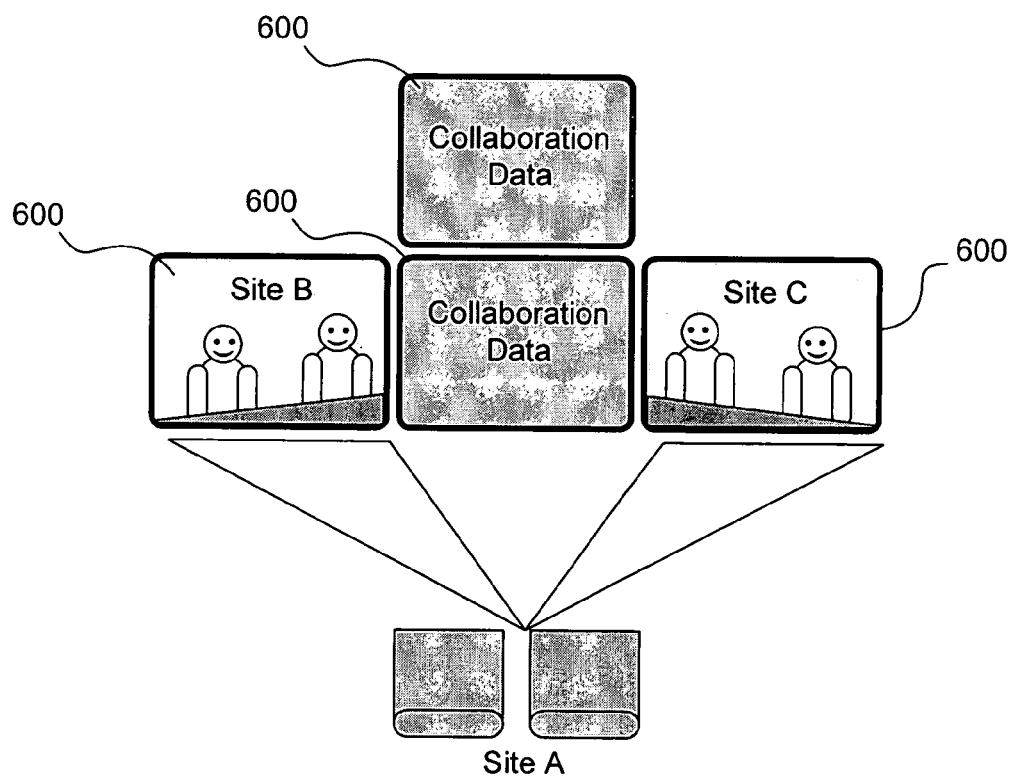

FIGS. 6A and 6B illustrate typical virtual relationships present in topologies containing four nodes. Similarly, FIGS. 6C and 6D illustrate optimal virtual relationships present in topologies containing three nodes, according to various embodiments. While FIGS. 6A through 6D illustrate topologies containing either three or four nodes, the present exemplary system is in no way limited to the topologies depicted. Rather, varying numbers of nodes (12) allow for many complex topologies. For a given event, the optimal virtual relationships may vary, even for topologies containing the same number of nodes. For example, node (12) capabilities may vary and can contain any combination of additional displays, cameras, or other node devices to allow additional relationships.

As illustrated in FIGS. 6A through 6D, each virtual site (sites A-D) depicted represents a node (12) with at least one attendee present. Additionally, for purposes of explanation only, each exemplary node (12) illustrated in FIGS. 6A through 6D has three cameras and four displays (600). However, nodes (12) participating in the present system and method may have any number of cameras and displays and are in no way limited to the configurations illustrated in FIGS. 6A through 6D.

According to one exemplary embodiment, the virtual relationships established between the various nodes (12) of the present exemplary system (100) can simulate spatial relationships between attendees and promote meaningful interaction. Particularly, according to one exemplary embodiment, the perceived topology and issued directives may correspond to certain virtual relationships being envisioned as seats around an imaginary table, where video and audio are perceived to come from the left, right, or directly in front of the attendee. According to one exemplary embodiment, the virtual relationships are maintained throughout an event, giving an event a sense of realism and eliminating distractions.

According to one exemplary embodiment, the consideration of virtual relationships between nodes (12) and their corresponding video streams allows an attendee to speak with remote attendees as if they were looking through a virtual window. One type of virtual relationship may include, for example, the association of a video input stream from an identified node with a corresponding display, camera, and video output stream to allow natural eye contact between attendees at the two nodes. If video from a first node (12) is displayed on the left-most display of a second node, the left-most camera of the second node may be configured to capture the video stream sent back to the first node. Consequently, when an attendee turns to view the left display, his expressions and comments are transmitted as if he were speaking directly to the attendee displayed on his screen. The connection of video streams to appropriate displays maintains natural eye contact and facilitates natural communication among attendees. Additionally, this exemplary configuration allows the participants to know when other participants are distracted or are shifting their attention from one participant to another.

In conjunction with the video arrangement described above, audio streams may also be linked between attendees based on a virtual relationship between the nodes. Specifically, according to one exemplary embodiment, audio recorded from a specific node (12) may be reproduced at the recipient node with the same orientation as the display showing the attendee transmitting the audio stream. Each attendee's voice received then corresponds spatially with the video image of that attendee, enhancing the perceived relationship between the attendees.

According to one exemplary embodiment, the event manager (10) stores topology data (26) containing a record of all virtual relationships present in an event and generates the above-mentioned perceived relationships. As the event manager (10) receives node requests (20), each change in topology takes into consideration the best configuration to maintain those virtual relationships and form new ones as necessary. These considerations allow smooth transitions between topologies with varied numbers of participating nodes (12).

While FIGS. 6A through 6D illustrate virtual relationships in exemplary 3 and 4 node (12) configurations, FIGS. 7A through 7D illustrate optimal media connections present in topologies containing three and four nodes where each node selects between three available camera views, according to one exemplary embodiment. As mentioned previously, the 3 and 4 node topologies are merely non-limiting examples. Any number of nodes may be managed according to the teachings of the present exemplary systems and methods.

According to one exemplary embodiment illustrated in FIGS. 7A through 7D, nodes are allowed to form virtual relationships based on the direction and assignment of streams received and transmitted, as illustrated in FIGS. 7A through 7D. As shown, each site, labeled "A" through "D," represents a node (12) with at least three cameras or available camera angles and at least three displays. The media connections indicated originate from the site specified and the left, center, or right camera view is indicated by a subscript of "L", "C", or "R." The designation "$D_C$," for example, indicates a media stream originating from the center camera of site or node D.

Figures 7A, 7B:
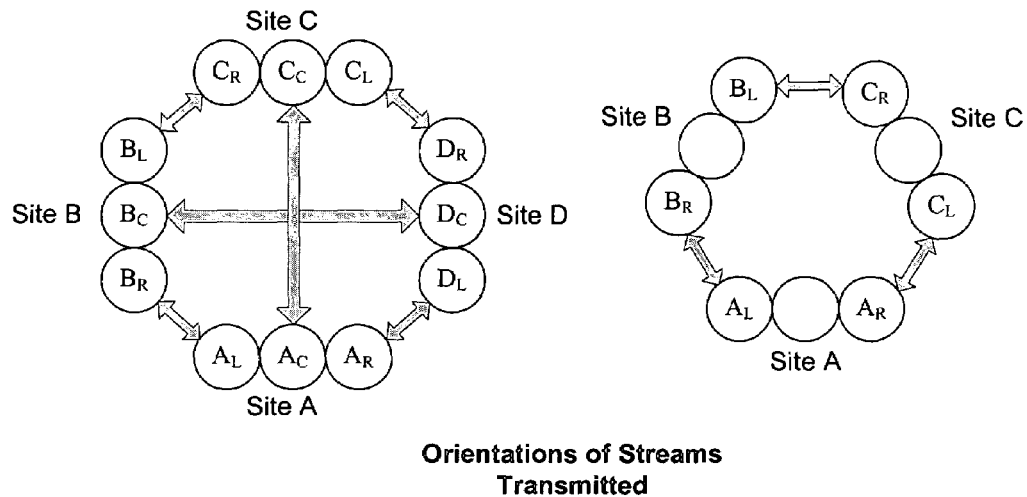
FIGS. 7A through 7D illustrate media streams transmitted and received during collaborative events involving 3 or 4 nodes, according to various exemplary embodiments.
Figures 7C, 7D:
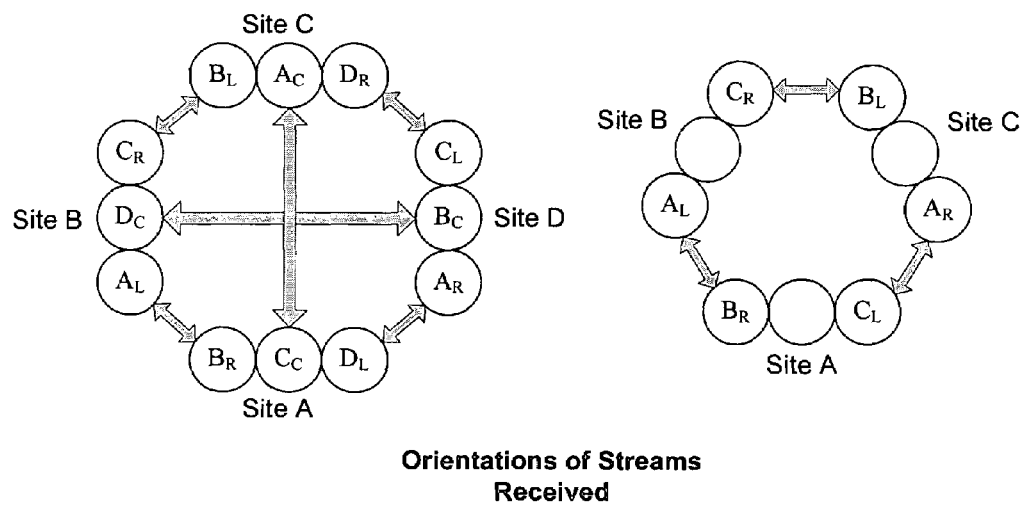

For example, in the four-node topology illustrated in FIG. 7A, the leftmost camera of site A transmits its stream "$A_L$" to the rightmost display of site B. Additionally, the leftmost display of site A ($A_L$) receives the rightmost camera view of site B denoted as "$B_R$." Moreover, as illustrated in FIG. 7C, the orientation of the streams transmitted corresponds to the orientation of the streams received in FIG. 7A, further adding to consistency and a sense of realism.

While the embodiments depicted in FIGS. 7A through 7D involve nodes (12) with at least three cameras and at least three displays, nodes with a variety of node devices (15) may participate in an event or even the event topology depicted. For example, a node (12) having only a telephone may participate in the topologies depicted through audio only. Attendee preferences, bandwidth limitations, policies and restrictions for a given event, node capabilities, and other factors are all considered by the event manager (10) in making appropriate media connection assignments (23).

Figure 8:
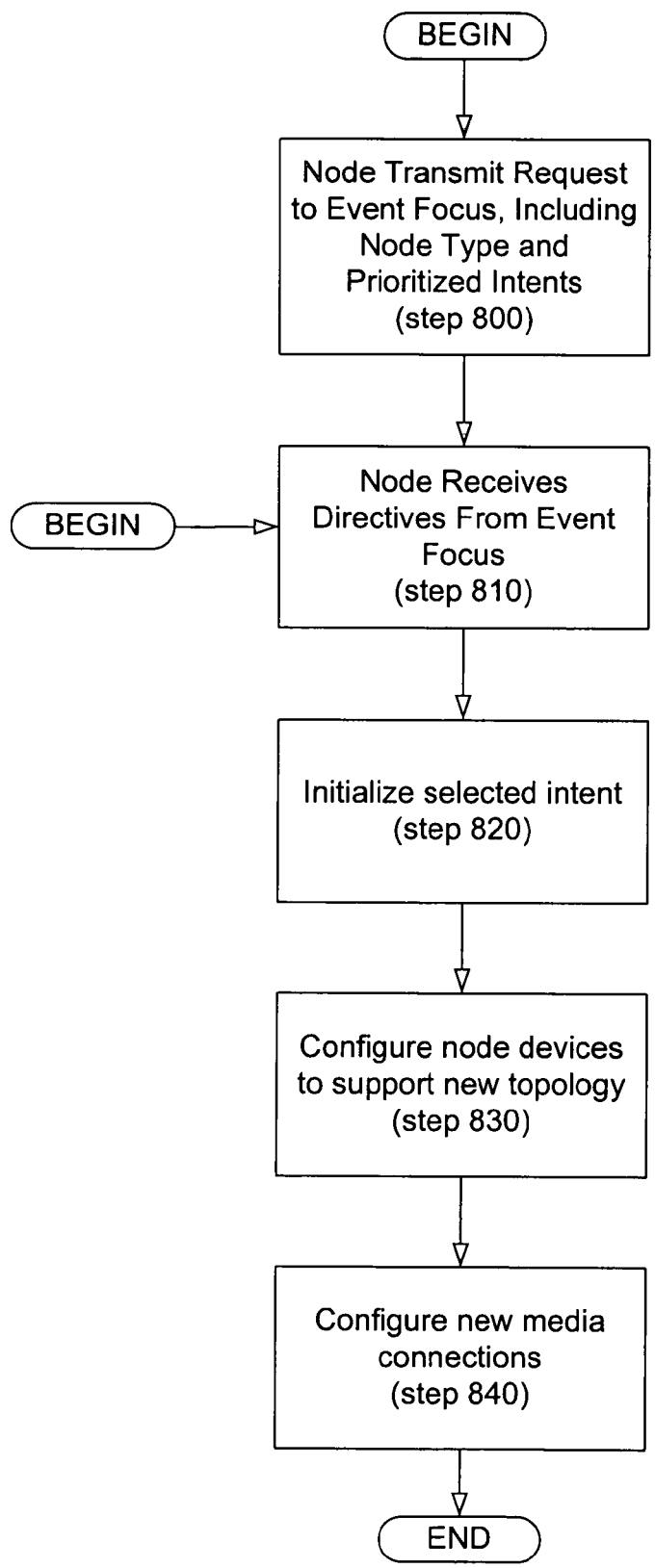
FIG. 8 is a flow chart illustrating a method of operation of a node service system, according to one exemplary embodiment.

Continuing with the methodologies of the present exemplary system (100), FIG. 8 illustrates an exemplary method of operation of the node manager according to one exemplary embodiment. While FIG. 8 illustrates exemplary steps of operation according to one embodiment, other embodiments may omit, add to, and/or modify any of the steps shown in FIG. 8, as will be understood by one of ordinary skill in the art.

As illustrated in FIG. 8, the exemplary virtual collaboration method may be initiated when a node (12) attempts to join or leave an event, or when a participating node changes its desired mode of participation. According to the present exemplary system and method, when a node (12) attempts to join or leave an event, or when a participating node changes its desired mode of participation, the node transmits a request to the event focus (11) (step 800). This request may include the prioritized list of intents as well as the node type of the requesting node (12). The information provided to the event focus (11) may be explicit, but may also be implicitly signaled by the type of request transmitted.

Once the node request (20) has been processed, the node (12) that initiated the request receives directives (21) from the event focus instructing which media connections have been assigned and which intent has been selected (step 810). Directives (21) can also be transmitted to all other nodes (12) that exchange media information with the requesting node in order to establish connections in the new topology. Consequently, as illustrated in FIG. 8, all of the communicatively coupled nodes (12) may also begin the process with the transmission of directives from the event focus (step 810), even without having initiated a request.

After receiving a directive (21), the node service software (16) associated with each node (12) coupled to the exemplary system (100) initializes the selected intent (step 820) corresponding to the received directive. Specifically, according to one exemplary embodiment, the node service (16) is configured to calculate a preferred configuration of node devices (15) to comply with the directive (21) received. Additionally, the node manager (16) associated with the receiving node (12) may also change settings or execute initialization software to initialize node functionality. According to one exemplary embodiment, any number of factors may be considered in selecting the preferred configuration for each node device in response to a receive directive. Particularly, allocation of the node devices (15) and previously received directives may influence the preferred configuration calculated by the node service (16).

Once the node has been initialized to the selected intent, the node manager software (16) configures the physical node devices (15) to allow them to support the assigned media connections and topology (step 830) and configures the node's environment to optimize participation. One embodiment, for example, may dim the lights near a node (12) to improve the visibility of a display. With the physical node devices (15) and the environment configured, the node is then ready to support as many connections as have been assigned and support the transmission and receipt of media in the forms specified by the selected intent.

Finally, the media streams (13) connecting each node (12) are established for the new topology (step 840). With the media streams established, the exchange of data begins and continues until additional directives change the mode of participation of each node (12).

Figure 9:
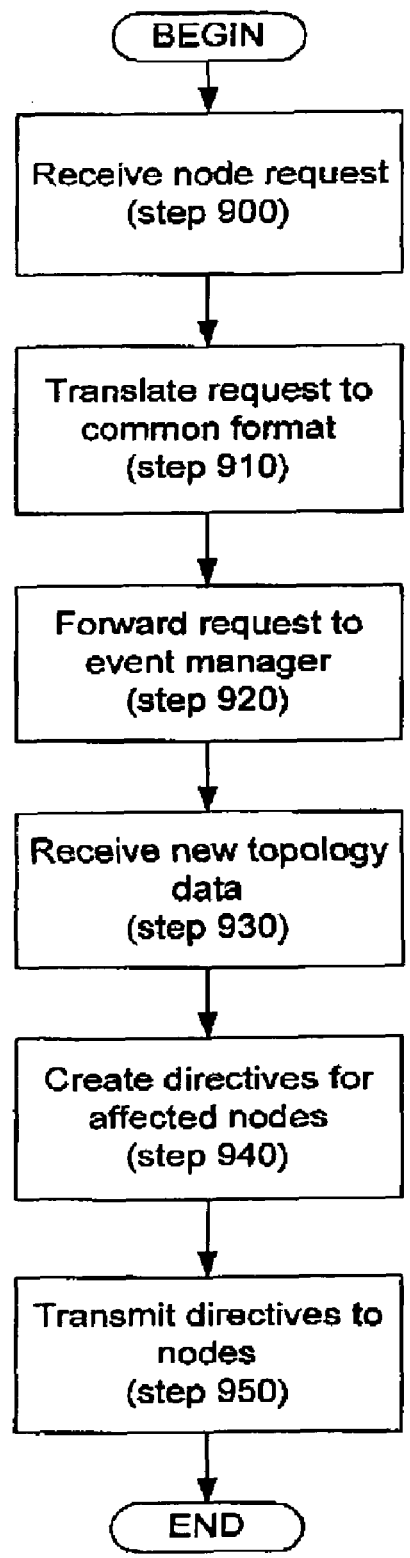
FIG. 9 is a flow chart illustrating a method of operation of a node event focus, according to one exemplary embodiment.

As mentioned above, the various nodes (12) receive directives from the event focus. FIG. 9 illustrates an exemplary method of operation of an associated event focus (11) during an event, according to one embodiment. While FIG. 9 illustrates exemplary steps according to one embodiment, other embodiments may omit, add to, and/or modify any of the steps shown in FIG. 9.

As illustrated, the operation of the event focus (11) begins when the event focus first receives a node request (step 900). As mentioned previously, the node request may be received from any number of nodes (12) communicatively coupled to the communication network.

Once the node request is received (step 900), the event focus translates the request received into a common format preferred by the event manager (step 910). The translation to a standard format may include providing a common interface to communicate between multiple network systems and protocols. According to one exemplary embodiment, any number of event manager preferred protocols may be used. Once the request is in the correct form, the event focus forwards the request to the event manager (step 920).

After the event manager has received and/or processed the node request, updated topology data is typically transmitted from the event manager (10) to the event focus (11). The event focus (11) receives the updated topology data from the event manager (step 930) and creates directives for the affected nodes based, at least in part, on the updated topology data (step 940). The topology data received from the event manager (10) designates the intents selected for each node as well as the source, destination, and type of each media stream connecting each node. The topology data is specific enough, for example, to maintain virtual relationships among nodes, such as the left camera view from one node being displayed on the right-most display of a second node. The event focus does not necessarily track the virtual relationships among the various nodes because those relationships are considered by the event manager (10). Consequently, according to one exemplary embodiment, the event focus (11) receives a complete and detailed specification of the event for all nodes that are connected to the particular event focus.

With the updated topology data received, the event focus creates directives instructing each node to establish the correct media connections and initialize the selected intent (step 940). The event focus then sends the recently created directives to each node (12) that has been affected by the change in topology (step 950) for implementation. The event focus (11) then awaits reception of further node requests (step 900).

Figure 10:
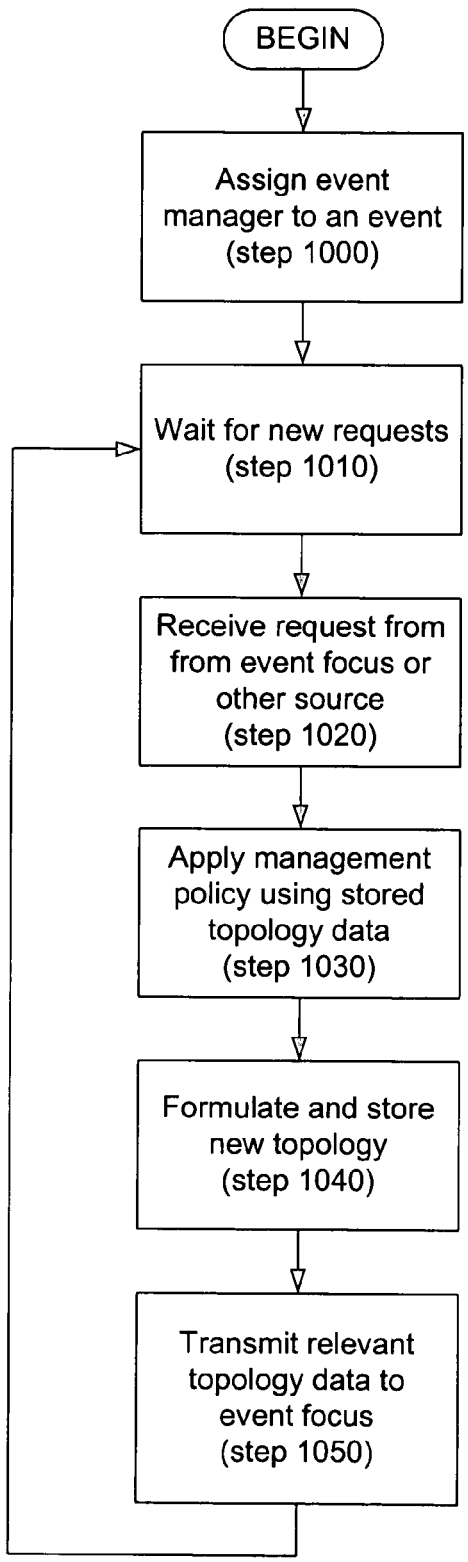
FIG. 10 is a flow chart illustrating a method of operation of an event manager, according to one exemplary embodiment.

In addition to the operation of the event focus (11), FIG. 10 illustrates an exemplary method of operation of the event manager (10) upon reception of node requests, according to one embodiment. While FIG. 10 illustrates exemplary steps according to one embodiment, other embodiments may omit, add to, and/or modify any of the steps shown in FIG. 10.

As shown in the exemplary method of FIG. 10, the operation begins when the event manager is first assigned to at least one event (step 1000). As mentioned previously, a single event manager may be assigned to any number of events, depending on the capabilities of the specific event manager.

After being assigned to at least one event, the event manager then waits for requests that will affect the topology of an event that the event manager is assigned to manage (step 1010). When the event manager does in fact receive requests from at least one event focus (step 1020) or from another client or source such as an administration tool, the information received may then be stored for later use. Requests may be received from sources such as scheduling applications or other support applications.

Specifically, according to one exemplary embodiment, the received information may be stored for use in responding to the received request. Based on at least one pre-configured management policy, the event manager can determine the best way to respond to the request (step 1030). One policy, for example, may use authentication to restrict participation to certain individuals. Another policy might request permission from an already participating node for a new node to join an event. Another policy might allow as many nodes to participate in an event as network bandwidth allows.

After the relevant management policies are applied, the event manager formulates a new topology and stores the state of the event (step 1040). According to one exemplary embodiment, the event manager takes into account the current topology and additional stored information, such as the prioritized intents of the nodes currently participating in the event. The event manager may then form the new topology to create and maintain effective virtual relationships among the participating nodes (12). Furthermore, the event manager (10) takes into account varying node capabilities and will not assign media connections that a node cannot support.

Once the new topology is created, the event manager transmits the topology data to at least one event focus (11) associated with the event (step 1050). The topology data includes information specific to each node, including all media connection assignments and selected intents for all nodes that communicate with a given event focus.

After the topology data has been updated and transmitted, the event manager returns to step 1010 to wait for additional requests.

In conclusion, the present exemplary configuration system and method are adapted to manage the configuration of virtual collaboration systems during event adjustment. Specifically, the present exemplary method can, among other things, intrinsically consider the relationships among related media streams, manage the virtual relationships among nodes to optimize the directives to the nodes to support a new topology, and support a variety of proprietary and industry-standard communications mechanisms while managing each node equivalently in the event itself. Further, the present exemplary system and method, according to one exemplary embodiment, maintains the virtual relationships between nodes throughout an event, giving the event a sense of realism while eliminating distractions.

The preceding description has been presented only to illustrate and describe embodiments of the present exemplary system and method. It is not intended to be exhaustive or to limit the system and method to any precise form disclosed. Many modifications and variations are possible in light of the above teaching.

What is claimed is:

1. A system comprising:
    a management subsystem including:
        an interface coupled to a network;
        a data storage module containing for each of multiple nodes coupled to the network, a node type and a record of prioritized intents;
    wherein the management subsystem is configured to:
        dynamically configure an event topology of a virtual collaborative event wherein the event topology simulates spatial relationships among attendees of the event, and
        receive and process requests originating from at least one node, wherein the configuration of said event topology includes the determination of media stream connections among multiple nodes based on at least one policy, wherein said media stream connections establish and maintain virtual relationships among said nodes with the connection of video streams to appropriate displays among multiple nodes to maintain natural eye contact and facilitate natural communication among the attendees; and
    at least one event focus coupled to the event management system configured to:
        receive node requests from at least one node,
        receive from the management subsystem a selected intent from the record of prioritized intents and media connection assignments for the node type, wherein a selected intent includes information about relationships among multiple devices at a node and specifies a subset of the capabilities of the at least one node to be utilized during a given event, and
        translate the selected intent and media connection assignments to directives for the at least one node.

2. The system of claim 1, wherein said data storage module is configured to store data describing said event topology of said virtual collaborative event to create event topology data.

3. The system of claim 2, wherein said event topology data includes at least one of: the identities of said nodes, the capabilities of said nodes, the current and preferred modes of participation of said nodes, virtual relationships among said nodes, and media stream assignments present, wherein the media stream assignments including sources, destinations, and media formats of streams present among said nodes.

4. The system of claim 2, wherein said at least one policy considers stored event topology data.

5. The system of claim 1, wherein said at least one policy considers at least one condition of the current event topology of said event.

6. The system of claim 1, wherein said event focus is part of a gateway subsystem configured to provide a common interface for receiving said requests, said gateway subsystem being capable of translating said requests from one or more nodes with one or more protocols into a protocol preferred by said management subsystem.

7. The system of claim 6, wherein said at least one event focus is configured to translate implicit requests into explicit requests for said management subsystem to process.

8. The system of claim 6, wherein said at least one event focus is configured to:
    receive event topology data from said management subsystem;
    translate media stream connections received into individualized directives; and
    communicate said directives to participating nodes through a variety of network types and protocols.

9. The system of claim 1, wherein said nodes comprise:
    a node service module;
    at least one policy of preferences configured prior to participation in an event;
    at least one physical device capable of transmitting and receiving media information;
    at least one physical device capable of presenting media information; and
    a communicative link with said event focus.

10. The system of claim 9, wherein said nodes further comprise at least one device for altering the environment of said nodes.

11. The system of claim 9, wherein said node service module is configured to:
communicate remotely with at least one event focus;
transmit requests to change a mode of participation of said node in an event; and
receive and respond to directives received from at least one event focus by configuring said physical devices.

12. The system of claim 11, wherein said node type include an indication of unchanging node capabilities, their relationship to one another, and a list of preferred modes of participation.

13. A system comprising:
a communication network communicatively coupled to a plurality of nodes;
a gateway subsystem including an event focus communicatively coupled to said communication network;
a management subsystem including a data storage module containing for each of the plurality of nodes, a node type and a record of prioritized intents, the management subsystem communicatively coupled to said gateway subsystem;
wherein said event focus of the gateway subsystem is configured to receive node requests from the plurality of nodes and selected intents from the record of prioritized intents and media stream connection assignments from the management subsystem and translate the node requests from said plurality of nodes for use by said management subsystem and the event focus is further configured to create directives to establish the correct media stream connections and initialize the selected intents to the respective plurality of nodes, and wherein a selected intent includes information about relationships among multiple devices at a node and specifies a subset of the capabilities of a respective node to be utilized during the virtual collaborative event; and
wherein said management subsystem is configured to dynamically manage the event topology to simulate spatial relationships among attendees with the connection of video streams to appropriate displays among the plurality of nodes to maintain natural eye contact and facilitate natural communication among the attendees of a virtual collaborative event based on said node requests and to transmit to said event focus a complete and detailed specification of the event for all nodes that are connected to the particular event focus.

14. A method of managing configuration of virtual collaboration systems during event adjustment, the method comprising:
transmitting a request for a node to alter participation in an event;
forwarding said request to an event management subsystem through an event focus;
formulating a new event topology based on at least one policy taking into account a current event topology and additional stored information including prioritized intents of the nodes participating in the event and varying node capabilities, wherein said new event topology creates and maintains virtual relationships among participating nodes to simulate spatial relationships among attendees of the event;
communicating new media stream assignments and selected intents to the event focus which creates directives to each node affected by the new event topology to initialize the respective selected intent, wherein a selected intent includes information about relationships among multiple devices at a node and specifies a subset of the capabilities of a respective node to be utilized during the event; and
configuring each affected node to establish media streams according to said media assignments with the connection of video streams to appropriate displays among nodes participating in the event to maintain natural eye contact and facilitate natural communication among the attendees without assigning media connections that a node cannot support.

15. The method of claim 14, wherein said configuring step includes adjusting the environment of at least one said affected node.

16. The method of claim 14, wherein said transmitting step includes transmitting a list of preferred modes of participation and an indication of an unchanging capability of a node.

17. The method of claim 14, wherein said request of said transmitting step is sent to update a set of stored preferences in said event management subsystem.

18. The method of claim 14, wherein said forwarding of a request comprises one of translating a request from one network type or protocol to a different network type or protocol, or interpreting an implicit request and converting said implicit request into an explicit request.

19. The method of claim 14, wherein said communicating step includes:
transmitting new event topology data to said event focus;
forming individualized directives for all affected nodes; and
transmitting each directive to the appropriate node.

20. The method of claim 14, wherein said configuring step includes:
configuring a node to support the assigned mode of participation;
configuring physical devices associated with the node according to said assigned mode of participation; and
establishing media streams with all other nodes specified in said received directive.

21. A system for an event for virtual collaboration, comprising:
a network coupled to an event focus configured to communicate to an event manager; and
at least one node communicatively coupled to said network, the at least one node including:
at least one physical device capable of transmitting and receiving media information;
at least one physical device capable of presenting media information;
a node manager including a node type indicating unchanging capabilities of the node and at least one policy of preferences configured prior to participation in an event including a list of prioritized intents, wherein an intent includes information about relationships among multiple physical devices at the at least one node and specifies a subset of the capabilities of the at least one node to be utilized during the event, wherein the node manager is configured to:
send a node request to the event focus when the list of prioritized intents is modified to be interpreted and converted to a format meaningful to the event manager, wherein said event manager includes a data storage module for storing the node type and the list of prioritized intents and is configured to dynamically manage the event topology of the event based on said node request and to transmit to said event focus a complete and detailed specification of the event for all at least one nodes that are connected to the event focus, wherein the event topology simulates spatial relationships among attendees of the event; and receive directives from the event focus including a selected intent and media connection assignments between the at least one node and other respective participating nodes of the event including the connection of video streams to appropriate displays among participating nodes to maintain natural eye contact and facilitate natural communication among the attendees of the event.

* * * * *